Dec. 21, 1937. G. H. BURTENSHAW 2,103,058
DENTURE DEMONSTRATING DEVICE
Filed Aug. 16, 1935 4 Sheets-Sheet 1
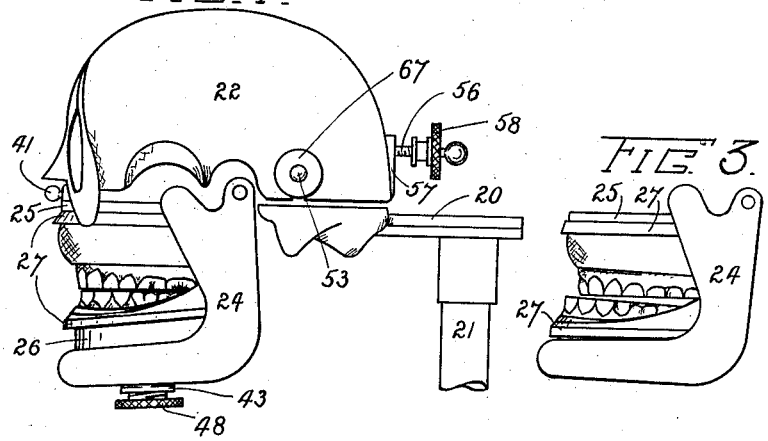
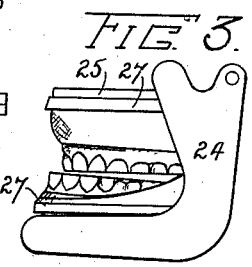
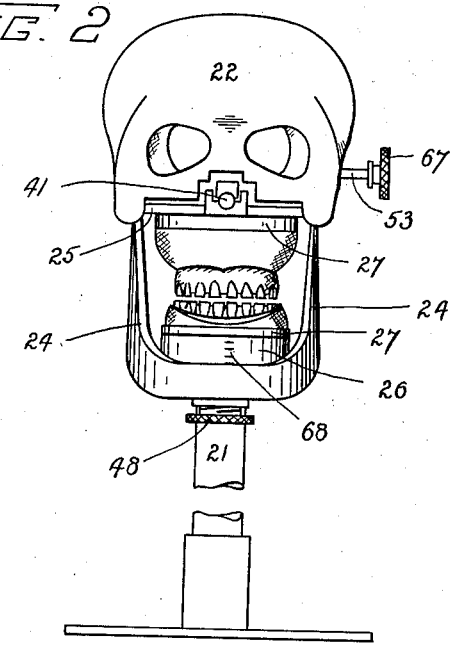
Inventor:
George Henry Burtenshaw
By Emil Bömelcke
Attorney

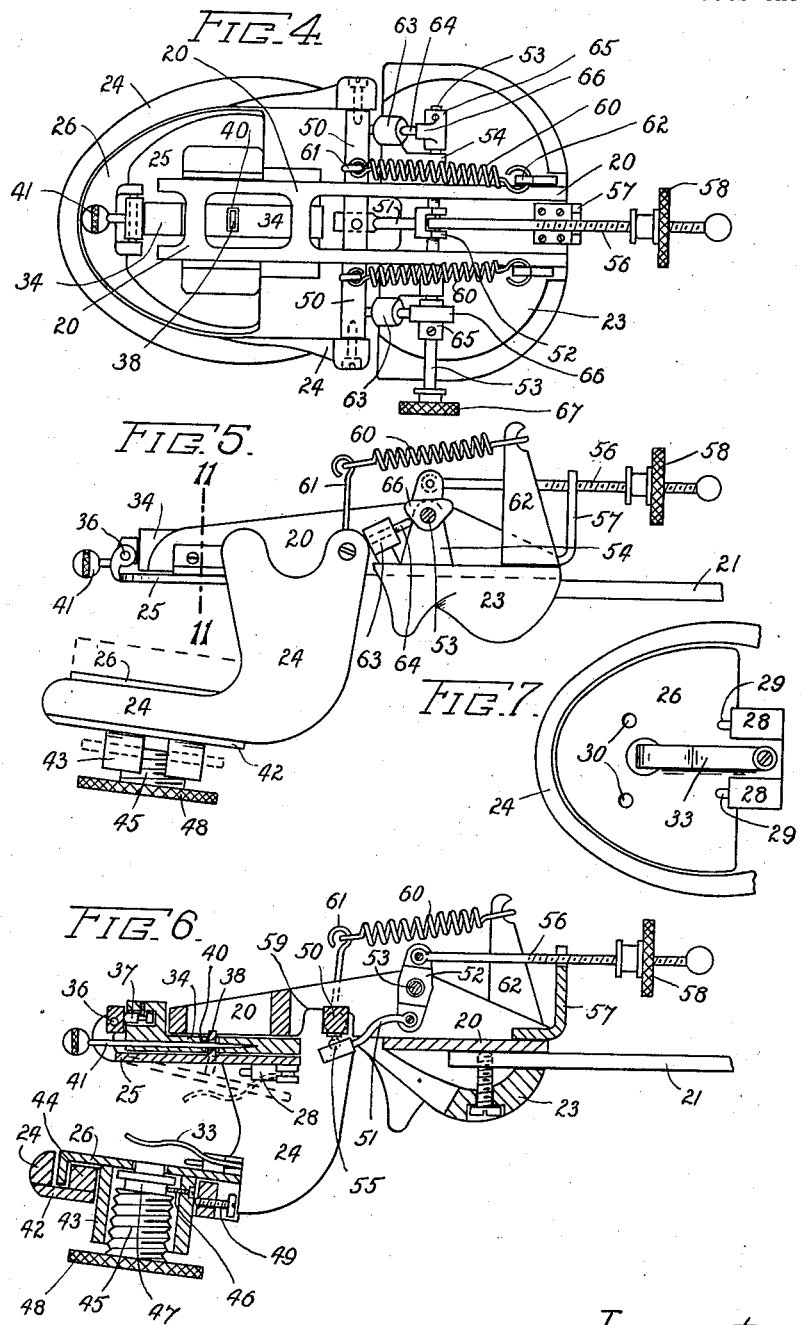

Dec. 21, 1937.  G. H. BURTENSHAW  2,103,058
DENTURE DEMONSTRATING DEVICE
Filed Aug. 16, 1935  4 Sheets-Sheet 3
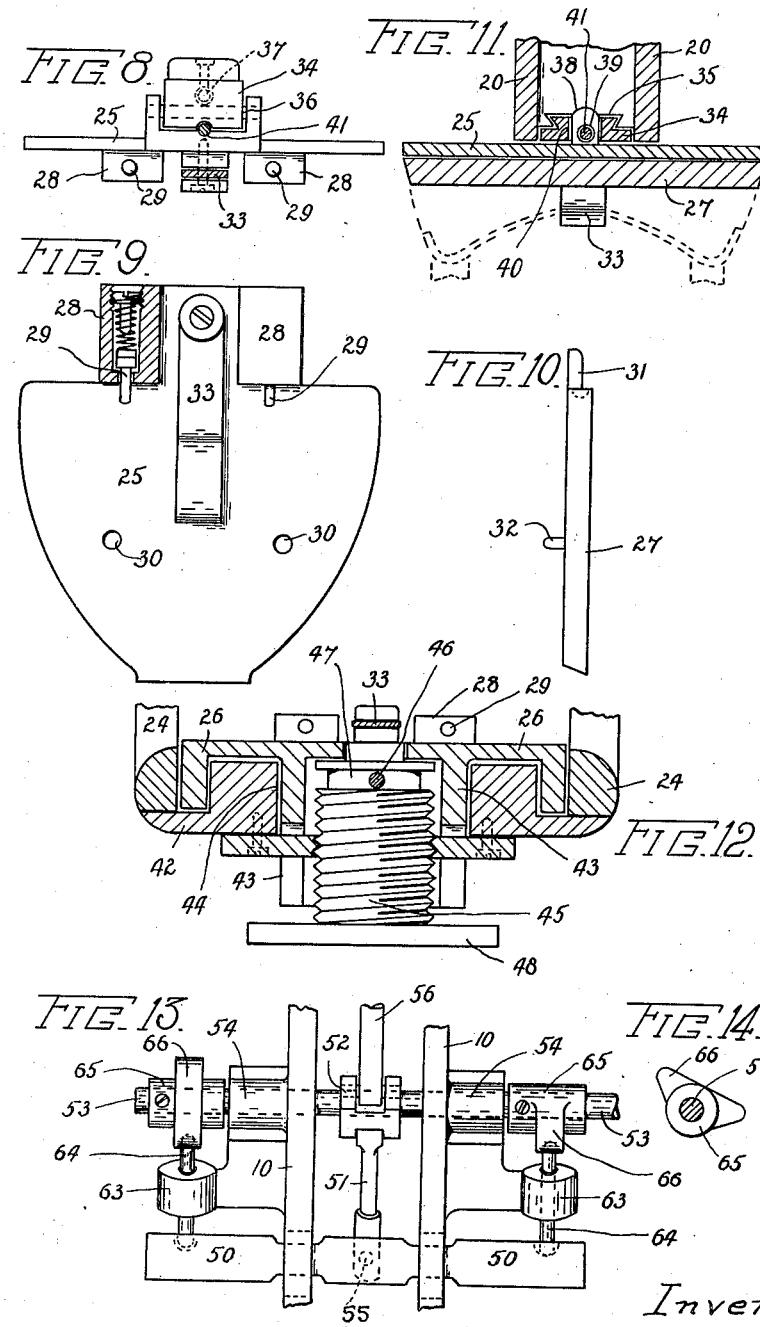
Inventor:
George Henry Burtenshaw
By Emil Bonnelycke
Attorney

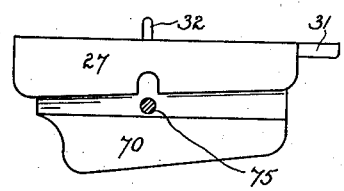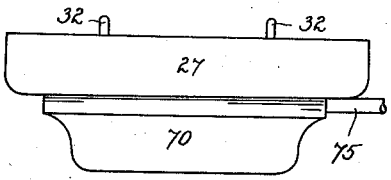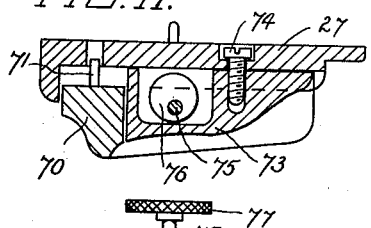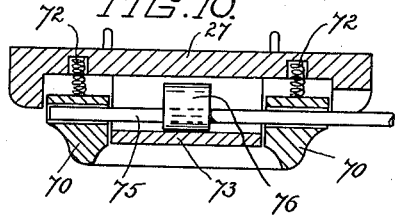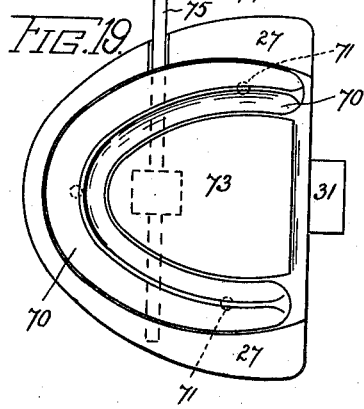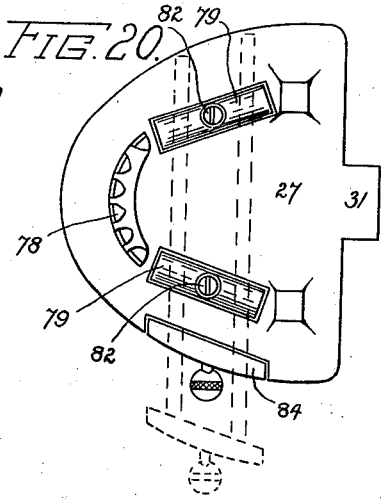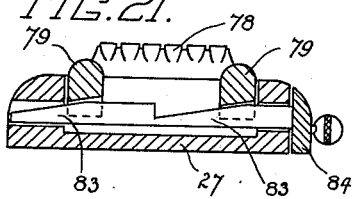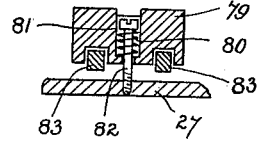

Patented Dec. 21, 1937

2,103,058

UNITED STATES PATENT OFFICE 2,103,058

DENTURE DEMONSTRATING DEVICE

George Henry Burtenshaw, Taumarunui, New Zealand, assignor to The Dentists' Supply Company of New York, New York, N. Y., a corporation of New York Application August 16, 1935, Serial No. 36,603
In New Zealand September 3, 1934

14 Claims. (Cl. 32—71)

This invention has reference to a new construction of machine, for use by dentists, for the purpose of demonstrating to patients the effects produced on artificial dentures through the shrinkage in the gums that takes place in the course of time after teeth extractions have been made, and which shrinkages result in unequal torsions and strains being placed on the plates and the teeth thereof, when such are being used for their general purposes, thereby causing breakages and other damages to the dentures. The use of the machine for this purpose therefore will serve to indicate to patients the effects produced in their action and appearance in these circumstances and the consequent need for remoulding or rebuilding of the dentures, and, at the same time, will give the dentist an indication of the amount of fault to be made up and also its nature in respect of sets of teeth that have already been worn.

In addition to its use for these purposes, the machine that has been designed may be employed for other purposes incidental to the making and setting of artificial dentures, as for instance as an alternative to the usual articulator employed in setting up the teeth, or for use in grinding the engaging faces of the upper and lower teeth in a full set, by working one set on the other with an abrasive medium placed between them.

The machine, by its general features of construction, provides for two denture plate carrying trays, having the usual plaster foundation blocks, being supported in upper and lower frame members so that respectively upper and lower denture sets may be positioned in their relative positions when placed upon the trays and the trays arranged in the frame members. Each frame member is so made that the position, and (or) level, of the tray therein may be varied from a position at which the denture upon it will be in full and correct engagement with its fellow placed in the other frame member, to any one of a number of positions in which the denture occupies a position represented by a specified amount of shrinkage in the gums or mouth of the person concerned with the dentures and thus the set of the plate with reference to its fellow shown for clear observation.

In fully describing the machine's construction and manner of operation, reference will be made to the accompanying sheets of drawings, in which:—

Figure 1 is a side elevation of the machine, as set up, and containing a double set of teeth disposed in normal relationship.

Figure 2 is a front elevation thereof.

Figure 3 is a sketch illustrating the manner in which the machine demonstrates the effect caused through a shrinkage in the gums of the teeth wearer.

Figure 4 is a plan, on a larger scale, showing the operative parts of the machine.

Figure 5 is a side elevation, and

Figure 6 a sectional side elevation thereof.

Figure 7 is a plan of the carrying plate of the lower frame member.

Figure 8 is a front elevation, and

Figure 9 an underneath plan, partly in section, of the carrying plate of the upper member, such views being drawn on a still larger scale.

Figure 10 is a side elevation of the denture tray usable in respect of either bottom or top frame.

Figure 11 is an enlarged cross sectional front view of the upper carrying plate and its mountings in the frame, taken approximately on the line 11—11 of Figure 5.

Figure 12 is a similarly enlarged front cross sectional view of the lower carrying plate.

Figure 13 is an enlarged detail view of the means used for supporting and articulating the lower frame.

Figure 14 is a side elevation of the cam used with these means.

Figure 15 is a side elevation of the upper denture tray as constructed to provide for the adjustment of the denture level thereon.

Figure 16 is a front elevation thereof.

Figure 17 is a sectional side elevation, and

Figure 18 a cross sectional elevation thereof.

Figure 19 is an underneath plan thereof.

Figure 20 is a plan of a lower denture tray as designed for indicating shrinkage with respect to gums in which the front natural teeth have been retained.

Figure 21 is a cross sectional elevation thereof.

Figure 22 is a detail view of a portion thereof.

In giving effect to the invention a horizontal base frame 20, composed of two parallel girder members with suitable cross bars, is provided, and such is arranged to extend forwardly from a standard 21 of any approved design adapted to support the frame and the means mounted thereon in a firm manner. Such frame may be provided, as shown in Figures 1 and 2, with a cover 22 adapted to enclose the mechanism hereinafter described and with a bottom 23 shaped to represent the upper portion of a human skull the lower jaw frame 24 of which forms part of the machine's mechanism, and allows for the whole assembly taking the form of a complete skull which has its teeth interchangeable. It is not necessary however, that this skull formation should be employed in every instance.

The said main frame 20 supports on its forward end the upper denture carrying plate 25 and at about its middle has suspended therefrom the lower jaw frame 24 in which the lower denture carrying plate 26 is held. Each of these plates is designed to receive and grip a flat metal denture tray 27 (shown in Figure 10) on which the denture plate and its plaster support are assembled in the usual manner of dental practice. Such tray 27 is designed to be held in position on its carrying plate 25 or 26 by being locked thereon through any suitable means. Those shown in the drawings comprise the formation of the carrying plate with two spaced blocks 28 at its rear edge, from the forward end of each of which a spring controlled pin 29 projects forwardly, and also with two spaced apertures 30 as in Figures 7 and 9. The denture tray is formed with a tongue extension 31 at its rear end which is adapted to pass in between the said blocks 28, and with two pins 32 on its inner face which are adapted when the rear end of the face is forced back against the spring pins 29, to enter the holes 30 in the plate and thus to be held on the plate. If desired, a flat spring 33 may be fastened to the plate rear to overlie the denture assembly when it has been thus placed on the plate and to more effectually hold it closely thereon.

Each of these plates 25 and 26 is made of corresponding shape with the trays 27 which are of the common approximately semi-elliptical form.

The upper plate 25 is carried on the front of the main frame by means of a universal joint attachment of its nose, or front end, to the front end of a carrier bar 34 which is constructed to slide longitudinally into the forward end of the frame 20, upon dovetail slides 35, as shown in the detail view Figure 11 and which will permit of its adjustment in the frame, and also its removal when needed, to facilitate the attachment or removal of a denture tray assembly to or from the carrying plate. The said universal joint attachment will permit of the tray 27 swinging down at its rear end, as on the pivots 36, or of rocking transversely as on the pin 37, by means of which the pivots 36 are supported on the bar 34. Provision is made however for locking the plate firmly in its horizontal position upon the frame, such provision comprising a transverse tongue 38 affixed to the upper surface of the plate, formed with an aperture 39 therein, a transverse groove 40 in the bar 34 into which this tongue enters when the plate is raised and a locking pin 41 which is designed to be passed in through the front of the bar 34 and through a hole bored through it and then through the aperture 39 of the tongue, as shown in Figure 6 and also in Figure 11.

The lower carrying plate 26 is let into a recess formed in the upper surface of the lower jaw frame 24 which is formed in the shape of jaw bones and has a closed bottom 42. The said plate 26 is mounted in this frame in a manner such that its surface level in relation thereto may be adjusted to different points and for this purpose it may suitably be mounted and constructed as shown in Figures 6 and 12. This provides that the plate 26 is formed with a hollow boss 43 projecting from its underside and the frame bottom 42 is made with a bearing 44 in which such boss is mounted to slide up and down. A screw threaded plug 45 is arranged within the boss hollow to rotate freely therein but is locked, as by the screw pin 46 engaging in a peripheral groove 47 in the plug, to cause the plate 26 and plug to move up and down together. This plug makes threaded engagement with the frame bottom 42 and its lower end has a thumb wheel 48 attached thereto so that the rotation of the plug may be effected and thus in its rotation, cause the plate 26 to be raised or lowered in the frame 24, while maintaining its correct surface alignment therewith. A set screw 49 (Figure 6) may be provided to pass through the boss bearing 44 to engage the boss 43 and thus to allow for the plate 26 being locked at any position in which it may be adjusted.

The said lower jaw frame 24 is carried by a cross bar 50 extending across beneath the main frame 20 and to the two ends of which the respective jaw bone sides of the jaw frame are rigidly attached. This cross bar is so mounted and controlled that it is designed to have a reciprocal to and fro rocking action imparted to it upon a central axis in order thus to work the jaw frame in a manner similar to the movements of the human lower jaw.

For this purpose it is supported at its centre by means of an arm 51 which extends forwardly from the lower end of a double crank device 52 which is loosely journalled upon a spindle 53 mounted in bearings 54 to extend across above the frame, and which crank device has its second end extending upwardly. The attachment of this arm 51 to the cross bar 50 is effected by means of a ball and socket joint connection 55 between the arm end and the cross bar in order that the cross bar ends may rock up and down and to and fro in the manner required. This cross bar is arranged within recesses 59 in the underside of the main frame girder members which allow for its to and fro movement, but provision is made whereby it may be locked from movement by forcing it bodily forward into close engagement with the forward ends of these recesses. For this purpose, a rod 56 is articulated to the upper arm of the double crank device 52 and extends rearwardly in the form of a screw and rests in a groove formed in a transverse vertical plate 57 affixed to the end of the frame 20. A thumb nut 58 is screwed on the end of this rod to engage the rear side of this plate so that by screwing this in, the crank device 52 is turned on its spindle in such a manner as to move the arm 51 forwardly and thereby to jamb the cross bar up against the recess fronts.

The cross bar 50 is, however, normally drawn rearwards at each of its ends by means of a tension spring 60 which extends from a vertical pin 61 upon the bar end in an upward incline to a fixture 62 upon the frame rear. These springs therefore in addition to drawing the bar rearwardly in the frame recesses 59 also draw the bar upwardly and hold it in the recesses, but with freedom to move forwardly independently at each of its ends, against the spring's tension.

Attached to each side of the frame 20 is a guide 63 which is positioned to the rear of the corresponding end of the cross bar 50, and in such guide a sliding pin 64 is mounted and which pin, at its forward end engages in a recess in the back of the cross bar (see Figure 13) and at its rear end projects beyond the guide. A cam boss 65 is secured on each end of the spindle 53 and such is formed with cam faces 66 which engage the rear end of the corresponding pin 64 and are kept in engagement therewith by the tension of the spring 60. These cam faces are shaped in any appropriate manner such that on the rotation of the spindle 53 they impart to the sliding pin, and through it, to the corresponding end of the cross bar 50, a to and fro rocking movement about its central axis 55 the extent and frequency of which is governed by the throw of the cams. The cams on the two ends are relatively arranged in a manner such as to cause the cross bar 50 to rock to and fro in respectively reverse order. A wheel 67 is mounted on the spindle end for turning it, and this wheel is situated outside the skull cover 22, as is also the locking thumb nut 58

The form of upper tray shown in Figures 15 to 19 is designed to provide for the indication of shrinkage effects in respect of the upper gums upon the operations of the dentures. It provides for a denture foundation 70 being let into the lower surface of the tray 27 so that it may move up and down therein in a horizontal plane, being mounted on sliding pins 71, and acted on by compression springs 72 to be normally forced downward to a maximum lowered position representing the original condition of the gums. A palate plate 73 is fixed to the tray 27 to fit within the foundation 70, being secured to the tray by means of the screw 74. A spindle 75 is mounted in the sides of the foundation 70 to extend transversely thereon, above a recess within the plate 73, and on this an eccentric cam 76 is fixed which by engagement with the plate 73, serves to hold the foundation in position and through the turning of which, by turning the spindle 75, the foundation may be raised less or more in relation to the tray level and thus to vary the level of the upper denture carried on the foundation in respect to its original position, and in correspondence with the extent of shrinkage in the upper gums. For thus turning the spindle 75, it is provided on one end projecting beyond the tray side, with a thumb wheel 77.

The lower tray fitting shown in Figures 20 to 22 is used in respect of lower jaw dentures in which the front teeth are absent and worn by individuals whose front natural teeth have been retained, and is intended to show the effects caused by the shrinkages in the side gums that then take place. The tray is formed at its front with a representation 78 of the natural teeth and let into it on each side thereof is a foundation block 79 for the support of the denture plate. This foundation block is normally forced downward by means of the compression spring 80 (Figure 22) acting between the bottom of a recess 81 in the block and the head of a guide screw 82 passing through such recess and screwed into the tray 27. It is designed to be forced upward and held there by means of the wedging pegs 83 mounted to slide transversely in the tray, beneath the block, and connected together by a cross head 84 fitting against the tray side. The same pegs are employed to actuate both blocks, as shown in Figure 21, so that when the cross head is drawn out less or more, the blocks, with the supported dentures, may be lowered in relation to the dummy fixed front teeth and thus the position in respect thereof revealed in the mounting of the tray in the lower carrying plate 26 of the demonstrator.

A full denture set may thus be arranged in the jaws of the device and may be adjusted to the correct normal alignment or engagement of one set upon the other or to any relative positions respecting shrinkage of either the upper or lower gums, or of both, and the positions then assumed by one set upon the other thereby defined. The movement of the lower jaw frame made possible by the mounting and operating means therefor, previously described, will then show the effects produced in the use of the plates for their ordinary purposes. In addition, by freeing the upper carrying plate 25 so that it is free to rock on its mountings in the main frame, the effects of the wrong articulation of the sets one upon the other produced by faulty formation of the dentures, or by gum shrinkages throwing the weight wrongly upon either set, may be plainly demonstrated.

There may also be combined with the apparatus as set up for use, a facial mask in which the chin is loose upon the upper portion and the two portions are mounted on the apparatus in proper relationship to the upper and lower jaw members thereof and with the lips of the mask arranged to show the teeth in the jaws. With such a mask the different facial expressions and facial distortions that take place with the gum shrinkages may be demonstrated in a natural and full manner.

I claim:—

1. Demonstrating and adjusting means for artificial dentures, comprising the combination with upper and lower denture trays, of a main horizontally extending frame, a carrying plate for the upper denture tray mounted on the forward end of said main frame, a lower jaw frame pivotally mounted on the upper jaw frame to simulate the human jaw structure, a lower denture tray carrying plate movably mounted on said lower jaw frame, guiding means for confining the movement of said lower tray carrying plate to a fixed substantially vertical direction relatively to the lower jaw frame while maintaining the surface of said plate in planes parallel to the plane of the lower jaw frame, and means for freely adjusting the position of said lower plate and denture tray carried thereby to simulate the shrinkage of the human gums.

2. Demonstrating and adjusting means for artificial dentures according to claim 1, in which the said carrying plate for the upper denture tray is mounted on the frame by means of a universal joint connection enabling it to tilt laterally and to swing longitudinally, and is provided with means for locking it from movement in a normal horizontal position.

3. Demonstrating and adjusting means for artificial dentures according to claim 1, in which the said upper denture tray is constructed with a denture foundation fitted into its under surface so as to move upward and downward therein and is normally forced downward to a lower level and is adapted to be raised to higher levels by the action of a lifting cam acting thereon.

4. Demonstrating and adjusting means for artificial dentures according to claim 1, in which the said lower carrying plate is mounted in the said lower frame in a manner such that it may be raised and lowered therein, while maintaining a horizontal plane, and has screw operated means for thus raising and lowering it therein.

5. Demonstrating and adjusting means for artificial dentures according to claim 1, in which the lower denture tray is formed with denture foundation side blocks disposed in its upper surface and capable of being raised or lowered in relation to such surface, each of which blocks is adapted to be held in a raised position by means of wedges and to be forced downward by a compression spring acting thereon.

6. Demonstrating and adjusting means for artificial dentures according to claim 1, in which the said lower frame is carried upon the main frame by means of a cross bar to the two ends of which the respective sides of the lower frame are affixed and which cross bar is supported at its middle upon a pivot support carried in the main frame, and is normally drawn rearwardly and upwardly against the lower side of the main frame by means of a spring acting upon each end thereof, and in which the said cross bar is adapted to be moved forwardly, independently at each of its ends, by means of a rotating cross spindle mounted in the main frame and having cams mounted on each end to engage the correspondingly respective ends of the cross bar.

7. A demonstrating and adjusting device for artificial dentures, comprising an upper jaw frame, an upper denture, means for mounting said denture in position on said frame, a lower jaw frame, means for pivotally mounting said lower jaw frame on the upper jaw frame to simulate the human jaw structure, a lower denture carried by the lower jaw frame, means for freely adjusting the position of the lower denture in a substantially vertical direction relatively to said lower jaw frame, and guiding means for confining the movement of the lower denture to a fixed substantially vertical direction relatively to the lower jaw frame while maintaining the initial occlusal surface alignment of the lower denture relatively to the lower jaw frame to simulate the displacement of an artificial lower denture in the human mouth upon shrinkage of the lower gums.

8. A demonstrating and adjusting device for artificial dentures, comprising an upper jaw frame, an upper denture, means for mounting said denture in position on said frame, a lower jaw frame, a bar extending substantially horizontally across said upper frame, means for rigidly mounting the lower jaw frame on said bar, means for slidably and pivotally mounting said bar on said upper frame for forward downward and rearward upward movement, a lower denture carried by the lower jaw frame, means for freely adjusting the position of the lower denture in a substantially vertical direction relatively to said lower jaw frame, guiding means for confining the movement of the lower denture to a fixed substantially vertical direction relatively to the lower jaw frame while maintaining the initial occlusal surface alignment of the lower denture relatively to the lower jaw frame to simulate the displacement of an artificial lower denture in the human mouth upon shrinkage of the lower gums, and means for separately displacing each end of said bar to transversely shift the lower jaw frame relatively to the upper jaw frame.

9. A demonstrating and adjusting device for artificial dentures, comprising an upper jaw frame, an upper denture, means for mounting said denture in position on said frame, a lower jaw frame, a bar extending substantially horizontally across said upper frame, means for rigidly mounting the lower jaw frame on said bar, means for slidably and pivotally mounting said bar on said upper frame for forward downward and rearward upward movement, a lower denture carried by the lower jaw frame, means for freely adjusting the position of the lower denture in a substantially vertical direction relatively to said lower jaw frame, guiding means for confining the movement of the lower denture to a fixed substantially vertical direction relatively to the lower jaw frame while maintaining the initial occlusal surface alignment of the lower denture relatively to the lower jaw frame to simulate the displacement of an artificial lower denture in the human mouth upon shrinkage of the lower gums, means for separately displacing each end of said bar to transversely shift the lower jaw frame relatively to the upper jaw frame, and means for displacing said lower jaw frame about its pivotal mounting.

10. A demonstrating and adjusting device for artificial dentures, comprising an upper jaw frame, an upper denture carried by said frame, means for freely adjusting the position of the upper denture in a substantially vertical direction relatively to said frame, guiding means for confining the movement of said denture to a fixed substantially vertical direction relatively to said frame while maintaining the initial occlusal surface alignment of said denture relatively to said frame to simulate the displacement of an upper artificial denture in the human mouth upon shrinkage of the upper gum, a lower jaw frame, means for pivotally mounting said lower jaw frame on the upper jaw frame to simulate the human jaw structure, a lower denture carried by the lower jaw frame, means for freely adjusting the position of the lower denture in a substantially vertical direction relatively to said lower jaw frame, and guiding means for confining the movement of the lower denture to a fixed substantially vertical direction relatively to the lower jaw frame while maintaining the correct surface alignment of the lower denture relatively to the lower jaw frame to simulate the displacement of an artificial lower denture in the human mouth upon shrinkage of the lower gums.

11. A denture tray for use in an artificial denture demonstrating and adjusting device, a denture foundation carried by said tray for supporting an artificial denture, means for guiding said foundation for movement in a fixed substantially vertical direction toward and away from said tray, while maintaining the supporting surface of said foundation always in planes substantially parallel to each other, and means for freely displacing said foundation to desired positions.

12. A denture tray for use in an artificial denture demonstrating and adjusting device, a denture foundation carried by said tray for supporting an artificial denture, means for guiding said foundation for movement in a fixed substantially vertical direction toward and away from said tray, while maintaining the supporting surface of said foundation always in planes substantially parallel to each other, means urging said foundation away from said tray to simulate the human gum structure shortly after extraction, and means for freely retracting said foundation toward said tray to simulate the shrinkage of the human gum structure after absorption has taken place.

13. A gum shrinkage demonstrating device for use in apparatus for demonstrating and adjusting artificial dentures, comprising a denture tray, a denture foundation in the form of a substantially U-shaped member carried by said tray for supporting an artificial denture, means for guiding said foundation for movement in a fixed substantially vertical direction on said tray to vary the distance between the denture supporting surface of the foundation and the tray, and means for freely displacing said foundation in said direction relatively to said tray.

14. A gum shrinkage demonstrating device for use in apparatus for demonstrating and adjusting artificial dentures, comprising a denture tray provided with a member simulating the human jaw ridges and having a partial set of teeth carried thereby, a portion of said tray being movable and forming a foundation for supporting a partial artificial denture, means for guiding said foundation for movement in a fixed substantially vertical direction relative to said tray, and means for displacing said foundation in said direction to displace the denture-supporting surface thereof toward the tray to simulate shrinkage of the human gums.

GEORGE HENRY BURTENSHAW.